Jan. 26, 1937.　　　　E. E. WEIK　　　　2,069,123
GAUGE
Filed March 13, 1936　　　2 Sheets-Sheet 1
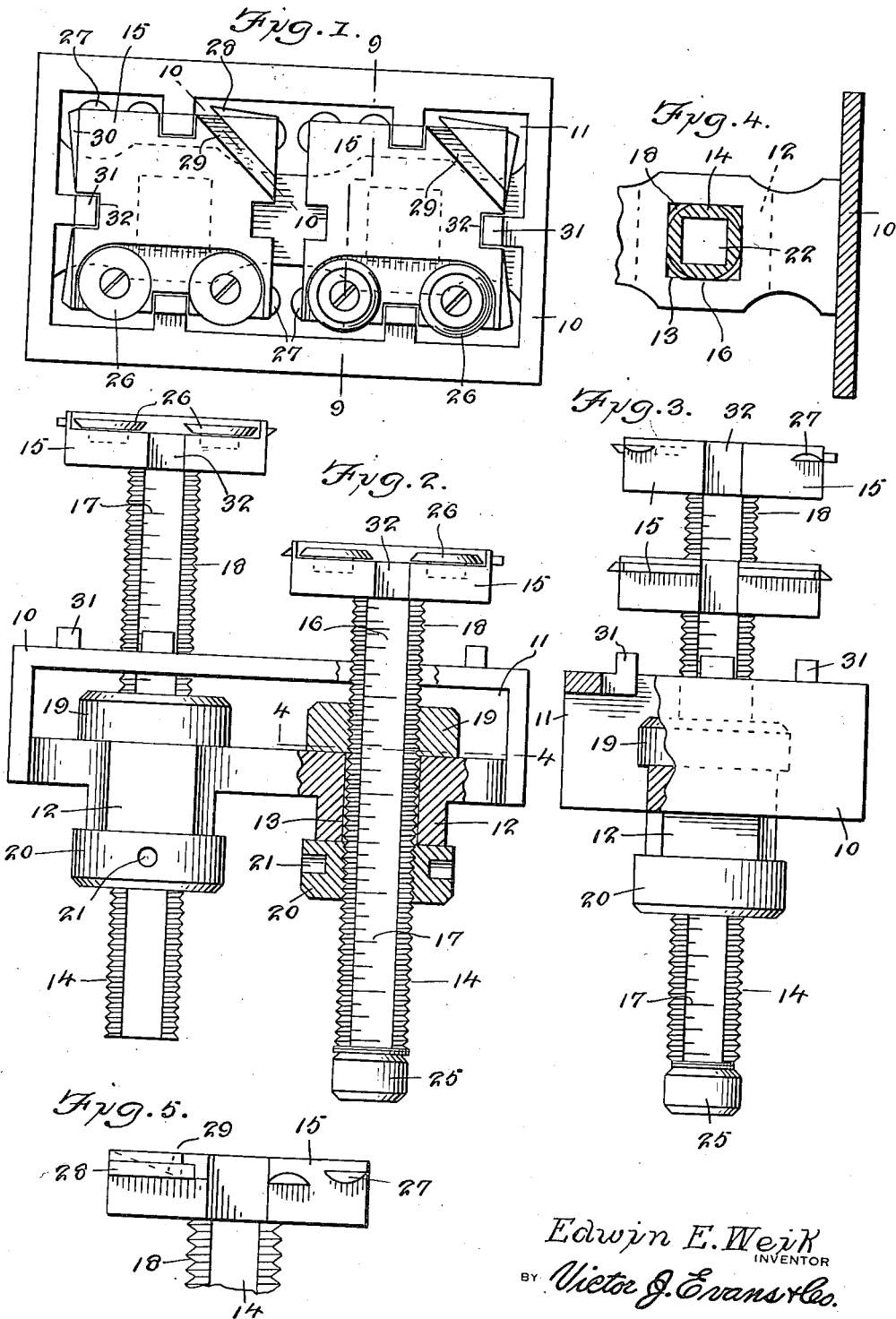
Edwin E. Weik
INVENTOR
BY Victor J. Evans & Co.
ATTORNEY Jan. 26, 1937. E. E. WEIK 2,069,123
GAUGE
Filed March 13, 1936 2 Sheets-Sheet 2
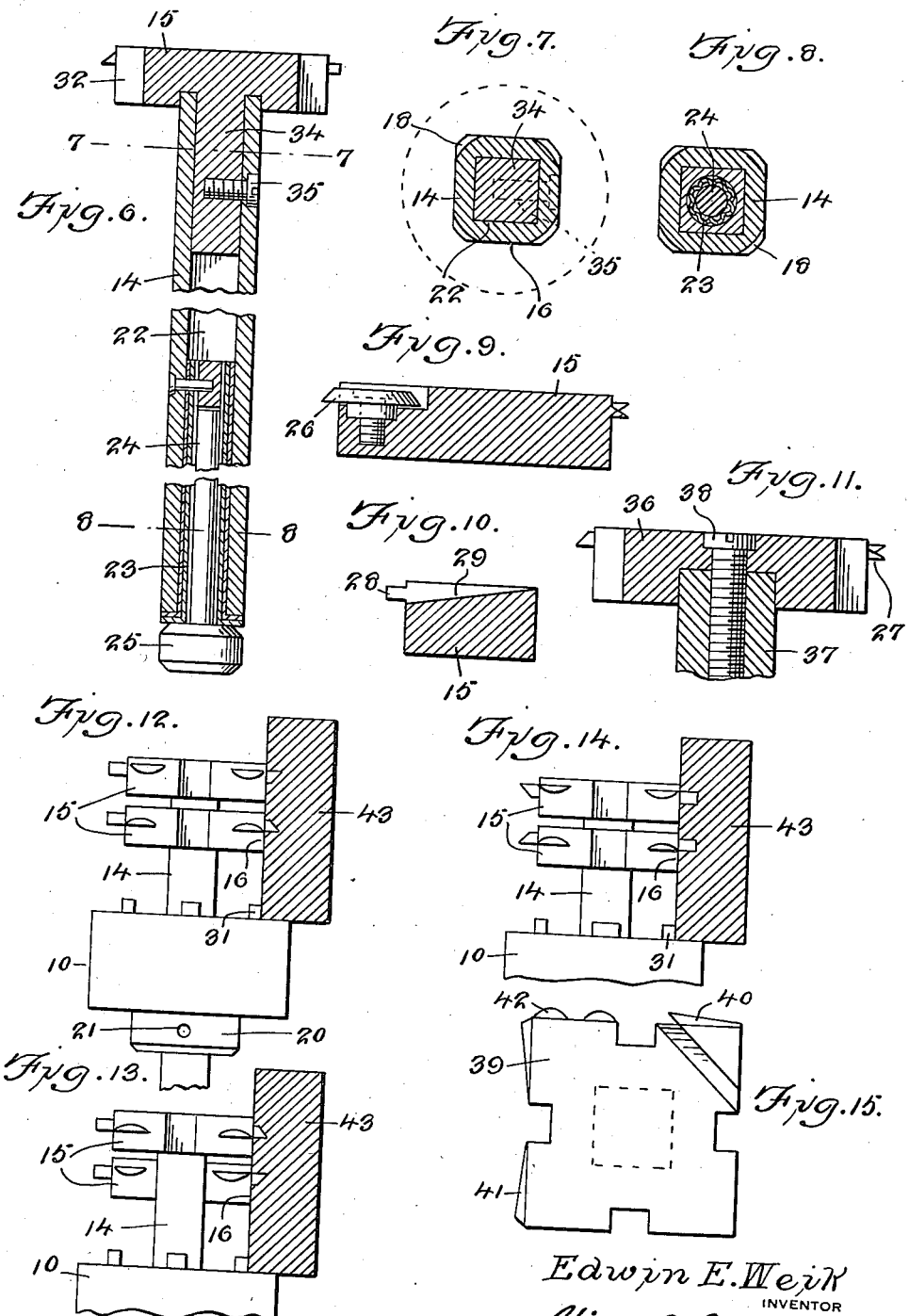
Edwin E. Weik
INVENTOR
BY Victor J. Evans & Co.
ATTORNEY Patented Jan. 26, 1937

2,069,123

UNITED STATES PATENT OFFICE 2,069,123

GAUGE

Edwin Emanuel Weik, Dunsmuir, Calif., assignor of one-half to John W. Thornton, Dunsmuir, Calif.

Application March 13, 1936, Serial No. 68,753

4 Claims. (Cl. 33—42)

The invention relates to a gauge and more especially to a multiple scoring head gauge for use by carpenters, mechanics or the like.

The primary object of the invention is the provision of a gauge of this character, wherein the scoring heads are adjustably carried and are adjustable with relation to each other so as to set the gauge for scoring work particularly in mortising for the fitting of locks, hinges or the like.

Another object of the invention is the provision of a gauge of this character, wherein accuracy is assured in the setting of the heads for marking or scoring work and also for gouging the work to clean the same between the marks or scoring for the fitting of parts particularly hardware including locks, hinges or the like, the gauge being readily and easily adjusted and is locked in such adjusted position and also said gauge is readily and conveniently handled.

A further object of the invention is the provision of a gauge of this character, which is simple in its construction, thoroughly reliable and effective in its operation, readily and easily adjusted, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is an elevation of the gauge constructed in accordance with the invention.

Figure 2 is a top plan view partly in section.

Figure 3 is an end elevation.

Figure 4 is a sectional view on the line 4—4 of Figure 2.

Figure 5 is a fragmentary side view of one of the scoring heads of the gauge.

Figure 6 is a longitudinal sectional view through one of the heads of the gauge.

Figure 7 is a sectional view on the line 7—7 of Figure 6.

Figure 8 is a sectional view on the line 8—8 of Figure 6.

Figure 9 is a sectional view on the line 9—9 of Figure 1.

Figure 10 is a sectional view on the line 10—10 of Figure 1.

Figure 11 is a fragmentary vertical sectional view through a head showing a modified form of fastening the same to its stem.

Figure 12 is a fragmentary side elevation showing the gauge in position with relation to a piece of work.

Figure 13 is a view similar to Figure 12 showing another position of the gauge.

Figure 14 is a view similar to Figure 13 showing a further position of the gauge.

Figure 15 is an elevation of a modified form of head for the gauge.

Similar reference characters indicate corresponding parts throughout the several views in the drawings.

Referring to the drawings in detail, the gauge comprises a body frame 10 having therein the longitudinal opening 11 while at one side of this frame are shoulders 12, these having openings 13 for accommodating loosely the stems or shanks 14 carrying the heads 15. Each stem or shank 14 is flat faced at 16 and one or opposite of these faces has provided thereon a graduated scale 17 for enabling accuracy in the adjustment of the stem or shank in the body frame 10.

Each stem or shank 14 is threaded at 18 for adjustably fitting in nuts 19 and 20, respectively, the nut 19 being located in the opening 11 while the nut 20 is outside of the said frame 10 and has contact with the shoulder 12. This nut 20 is formed in its periphery with sockets 21 for a key hereinafter described.

In one of the stems or shanks 14 is a bore 22 having permanently fitted therein a corrugated tubular sleeve 23 for frictionally holding a key 24 when inserted therein. This key 24 has a finger grip 25 and such key is selectively accommodated in the sockets 21 for the turning of the nut 20 when in use. When not in use the key 24 fits within the sleeve 23 permanently held within the stem or shank 14 so as to be handy for use in setting the gauge, that is the heads 15 thereof.

Each head 15 has fitted therewith the movable scoring or marking wheels 26 which protrude beyond the edge next thereto while formed at two other edges thereof are the half circular scoring or marking nibs 27, those on each edge being reversed with relation to each other. At one corner of each head 15 is a routing blade 28 while next to the latter is a diagonally disposed throat 29 for the dispensing of the material routed from a piece of work. At another edge of each head 15 are the reversely disposed gougers 30.

The body frame 10 has projecting therefrom in the direction of the heads 15 lugs 31, these being accommodated in companion notches 32 provided in the heads 15 at opposite side edges thereof when the said heads are moved toward the body frame 10 and in close relation or contacting therewith.

The stems or shanks 14 are preferably of square formation in cross section and have the rounded threaded edges 18 while the openings 13 in the frame 10 are similarly shaped to the cross sectional formation of these stems or shanks. The nuts 19 can be readily turned for the setting and locking of the stems or shanks 14 in the setting of the gauge.

Each head 15 is formed with a central extension 34 which is telescoped within its companion stem or shank and made secure by a retaining screw 35.

In Figure 11 of the drawings there is shown a slight modification wherein the head 36 is made fast to its stem or shank 37 by a headed bolt 38 centrally fitting the head and the said stem or shank.

In Figure 15 of the drawings there is shown a slight modification of head 39, it being devoid of the scoring or marking wheels and carries the routing blade 40 and gougers 41, respectively, as well as the half circular shaped nibs 42.

In the use of the gauge it will mark or score a piece of work 43 and also will rout or gouge the work between the scoring or marking for mortising of hardware, such as hinges, locks or the like when mounting the same with the work.

The heads 15 or 39 of the gauge can be readily adjusted with relation to each other as in this instance the gauge is equipped with two heads so as to position the scoring or marking properly and accurately in the work and the nuts 19 and 20 coact for adjustment and locking of the said heads in their adjusted or set positions. The lugs 31 function as slide runners for the body frame 10 when disposed against the work 43 as is clearly shown in Figures 12 to 14 inclusive of the drawings.

What is claimed is:

1. A gauge of the character described comprising a body frame having an open center, a plurality of stems slidable through said frame, nuts inside and outside of said frame and threaded on said stems for the adjustable fastening of the latter to one side of the frame both interiorly and exteriorly of said open center, heads on said stems and having marking and scoring means at the edges thereof, and a key frictionally fitting one of the stems and engageable with one of the nuts on each stem for the turning thereof.

2. A gauge of the character described comprising a body frame having an open center, a plurality of stems slidable through said frame, nuts inside and outside of said frame and threaded on said stems for the adjustable fastening of the latter to one side of the frame both interiorly and exteriorly of said open center, heads on said stems and having marking and scoring means at the edges thereof, a key frictionally fitting one of the stems and engageable with one of the nuts on each stem for the turning thereof, and guide lugs formed on the frame at that side next to the heads and arranged on said frame for effecting slide runners therefor when applied to a piece of work.

3. A gauge of the character described comprising a body frame having an open center, a plurality of stems slidable through said frame, nuts inside and outside of said frame and threaded on said stems for the adjustable fastening of the latter to one side of the frame both interiorly and exteriorly of said open center, heads on said stems and having marking and scoring means at the edges thereof, a key frictionally fitting one of the stems and engageable with one of the nuts on each stem for the turning thereof, and guide lugs formed on the frame at that side next to the heads and arranged on said frame for effecting slide runners therefor when applied to a piece of work, certain of the marking means being rotatably supported.

4. A gauge of the character described comprising a body frame having an open center, a plurality of stems slidable through said frame, nuts inside and outside of said frame and threaded on said stems for the adjustable fastening of the latter to one side of the frame both interiorly and exteriorly of said open center, heads on said stems and having marking and scoring means at the edges thereof, a key frictionally fitting one of the stems and engageable with one of the nuts on each stem for the turning thereof, and guide lugs formed on the frame at that side next to the heads and arranged on said frame for effecting slide runners therefor when applied to a piece of work, certain of the marking means being rotatably supported, the said heads having passages for loosened material during scoring of a piece of work.

EDWIN EMANUEL WEIK.